United States Patent [19]

Kinoshita

[11] Patent Number: 4,736,827
[45] Date of Patent: Apr. 12, 1988

[54] ONE-WAY CLUTCH
[75] Inventor: Yoshio Kinoshita, Ayase, Japan
[73] Assignee: NSK-Warner K.K., Tokyo, Japan
[21] Appl. No.: 66
[22] Filed: Jan. 2, 1987
[30] Foreign Application Priority Data
  Jan. 22, 1986 [JP] Japan .................. 61-6557[U]
[51] Int. Cl.$^4$ ............................................. F16D 41/07
[52] U.S. Cl. .................. 192/41 A; 192/45.1; 188/82.8
[58] Field of Search ............. 192/41 A, 43.1, 44, 192/45, 45.1, 46; 188/82.1, 82.7, 82.77, 82.8, 82.84; 384/564

[56] References Cited

U.S. PATENT DOCUMENTS

| 2,683,509 | 7/1954 | Jandasek | 192/45.1 |
| 2,912,086 | 11/1959 | Troendly et al. | 192/45.1 |
| 4,106,602 | 8/1978 | Dieckermann | 192/45 |
| 4,619,352 | 10/1986 | Shoji et al. | 192/41 A |

FOREIGN PATENT DOCUMENTS

| 1121078 | 7/1956 | France | 192/45 |
| 52255 | 4/1979 | Japan | 192/45 |
| 34528 | 2/1985 | Japan | 192/45 |
| 56832 | 4/1985 | Japan . | |
| 104818 | 6/1985 | Japan | 192/41 A |
| 2073339 | 10/1981 | United Kingdom | 192/45 |

Primary Examiner—Rodney H. Bonick
Assistant Examiner—David A. Testardi
Attorney, Agent, or Firm—Wegner & Bretschneider

[57] ABSTRACT

A one-way clutch includes first and second rotary members arranged concentrically and rotatably relative to each other with an annular spacing therebetween, a torque-transmitting member provided between the first and second rotary members to transmit torques between the first and second rotary members, and a sliding bearing provided between the first and second rotary members so as to maintain the first and second rotary members in a concentric relation. The sliding bearing has a first flange and second flanges extending along the mutually-opposing surfaces of the first and second rotary members and tangs extending in the radial direction and secured on the second rotary member. The first flange is slidable on the first rotary member, while the second flanges are in contact with the second rotary member.

7 Claims, 2 Drawing Sheets

ONE-WAY CLUTCH

BACKGROUND OF THE INVENTION (1) Field of the Invention

This invention relates to a one-way clutch (hereinafter called "OWC" for the sake of brevity), specifically, to an OWC equipped with a sliding bearing which also serves as a holder plate.

(2) Description of the Prior Art

Conventionally, OWCs have usually been assembled in machines and the like as shown in FIG. 4. Upon assembly of an OWC, sliding bearings 109 are provided first of all on both sides of the OWC to avoid disengagement of the OWC from an outer race 102 and at the same time to maintain the concentricity of an outer race 102 and inner race 103. Holder plates 107, which are adapted to contact the sliding bearing 109 from both sides of the OWC to hold the OWC in place, are then fixed on the outer race 102.

In each of such conventional OWCs, the holder plates are provided on both axially-outer side walls of the sliding bearing. The axial dimension of the OWC is hence increased by the thicknesses of the holder plates, leading to a drawback that an apparatus cannot be designed in a compact size. Since the sliding bearing and holder plates are discrete members, there are additional drawbacks that many parts are needed and many assembly steps are required.

SUMMARY OF THE INVENTION

An object of this invention is therefore to provide an OWC which is equipped with a sliding bearing capable of serving as a holder plate too, and can solve the above-mentioned drawbacks and is compact and inexpensive.

In one aspect of this invention, there is thus provided a one-way clutch including first and second rotary members arranged concentrically and rotatably relative to each other with an annular spacing therebetween, a torque-transmitting member provided between the first and second rotary members to transmit torques between the first and second rotary members, and a sliding bearing provided between the first and second rotary members so as to maintain the first and second rotary members in a concentric relation. The sliding bearing has a first flange and second flanges extending along the mutually-opposing surfaces of the first and second rotary members and tangs extending in the radial direction and secured on the second rotary member, the first flange is slidable on the first rotary member, and the second flanges are in contact with the second rotary member.

The OWC of the present invention has numerous advantages. Since the sliding bearing also serves as a holder plate, it is possible to reduce the overall width for the attachment of the OWC. In other words, it is possible to design an apparatus in a compact size.

The OWC of this invention has fewer parts, because two separate parts have conventionally been required as the sliding bearing and holder plate but only one part can serve both sliding bearing and holder plate in the present invention. The assembly steps have hence been simplified, leading to a reduction to the assembly cost. As shown in FIG. 5, certain conventional OWCs are held in place by holder plates only. Compared with such conventional OWCs, the OWC of this invention can improve the centering performance for the inner and outer races without changing the width for its attachment as readily envisaged from FIG. 4.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
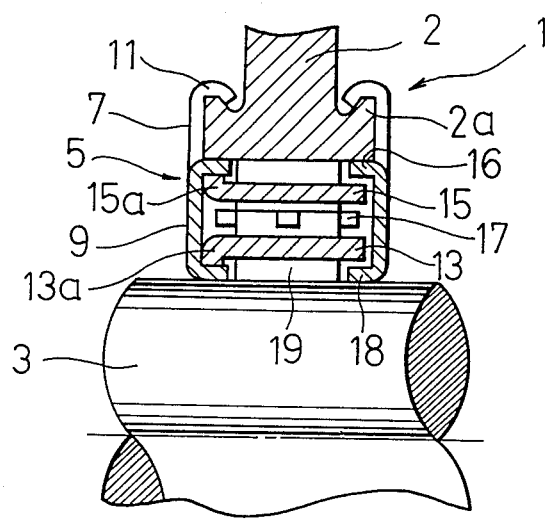
FIG. 1 is a cross-sectional view of an OWC according to one embodiment of this invention, which is equipped with sliding bearings capable of serving as holder plates too.

Referring first to FIG. 1, an OWC 1 according to this invention is shown along with sliding bearings 5 serving as holder plates too. The OWC 1 is composed of a first rotary member, i.e., an outer race 2 and a second rotary member concentric with the outer race 2, i.e., an inner race 3. Within an annular spacing between both races 2 and 3, sprags 19 in the shape of a peanut shell are arranged with equal angular intervals so as to transmit torques between both races 2 and 3. The sprags 19 are held in place by inner and outer cages 13,15 each of which has an annular shape. In addition, an annular ribbon spring 17 is interposed between the inner and outer cages 13,15, thereby applying a raising moment to each of the sprags 19. The inner and outer cages 13,15 are each equipped with annular flange 13a and 15a which are respectively bent at right angles at one end portions thereof. The flange 13a extends toward the inner race 3, while the flange 15a extends toward the outer race 2.

The sliding bearings 5 are each formed of a bearing portion 9, which has annular bearing flanges 16,18 and serves as a sliding bearing, and tangs, in other words, holder plate sections 7. As apparent from FIG. 1, the axially outer side walls of the bearing portion 9 and holder plate sections 7 are aligned, in other words, lie in the same plane. The bearing flanges 16 are in contact with the outer race 2, whereas the bearing flange 18 is maintained in a slidable relation with the inner race 3 only. Owing to the interposition of the bearing portion 9, both races 2,3 are held concentric with each other. The holder plate portions 7 each terminates in an outer flange 11, which is staked on an annular edge portion 2a extending out from the outer race 2. The sliding bearings 5 are hence fixed on the OWC 1. In addition, the bearing flanges 16,18 are maintained at their inner walls in contact with the flanges 15a,13a respectively.

Figure 2:
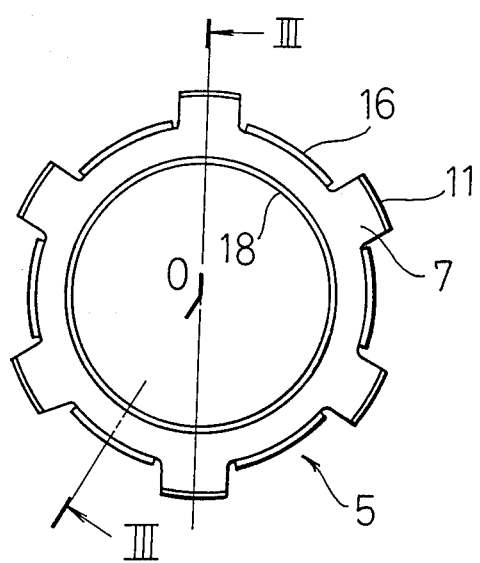
FIG. 2 is a front view of one of the sliding bearing which also serves as a holder plate.
Figure 3:
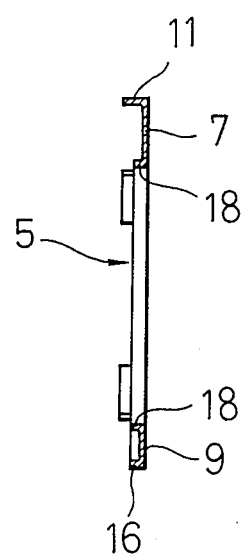
FIG. 3 is a cross-sectional view taken along line III—O—III of FIG. 2.
Figure 4:
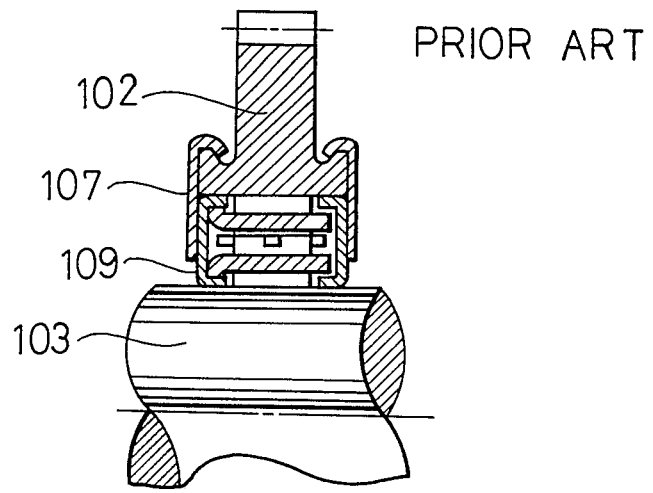
FIG. 4 is a cross-sectional view of a conventional OWC.
Figure 5:
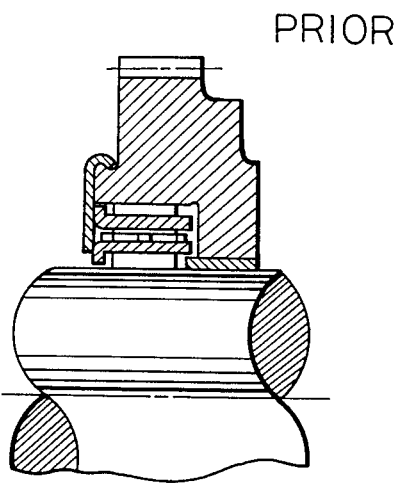
FIG. 5 is a cross-sectional view of another conventional OWC, which is held in place by a holder plate only.
Figure 6:
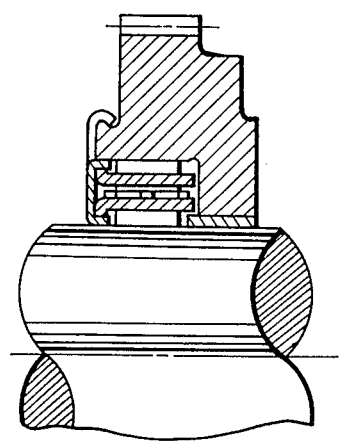
FIG. 6 is a cross-sectional view similar to FIG. 5 except that the sliding bearing of FIG. 2 is attached.

Referring next to FIGS. 2 and 3, a description will be made of the details of each sliding bearing 5 before its attachment on the OWC 1, namely, before its outer flange 11 is staked. As depicted in FIG. 2, the sliding bearing 5 is an annular member. Six holder plate sections 7 extend out from the outer periphery of the sliding bearing 5. It is not essential to have six holder plate sections 7. It is sufficient if at least 3 holder plate sections are arranged with equal angular intervals.

FIG. 3 illustrates the relationship between the bearing portion 9 and the holder plate sections 7 in each sliding bearing 5. The bearing portion 9 is maintained at the bearing flange 18 in sliding contact with the inner race 3. The holder plate sections 7 are secured at the outer flange 11 on the annular edge portion 2a of the outer race 2.

The holder plate sections 7 may be extended inwardly in the radial direction so as to fix them on the inner race 3. In this case, the bearing flange 18 is provided on the side of the outer race 2 and is maintained in sliding contact with the outer race 2.

As readily envisaged from FIGS. 2 and 3, each sliding bearing 5 is formed as an integral member by die-stamping a single steel plate.

In the prior art, the sliding bearing or bearings are fixed neither to the associated outer race nor to the associated inner race, that is, are floating between the outer and inner races. Therefore, they tend to rotate following the outer and/or inner races. By contrast, the sliding bearing or bearings are fixed on the associated outer race in each of the above-described embodiments of this invention. Accordingly, the sliding bearing or bearings do not rotate following the rotation of the inner or outer race.

Having now fully described the invention, it will be apparent to one of ordinary skill in the art that many changes and modifications can be made thereto without departing from the spirit or scope of the invention as set forth herein.

I claim:

1. In a one-way clutch including first and second rotary members arranged concentrically and rotatably relative to each other with an annular spacing therebetween, a torque-transmitting member provided between the first and second rotary members to transmit torques between the first and second rotary members, and a sliding bearing provided between the first and second rotary members so as to maintain the first and second rotary members in a concentric relation, the improvement wherein the sliding bearing comprises a first flange and second flanges extending along the mutually-opposing surfaces of the first and second rotary members, respectively, and tangs extending in the radial direction, each of said tangs having a hook-like holding portion which engages the second rotary member and prevents axial displacement of the sliding bearing away from the second rotary member, the first flange being slidable on the first rotary member, and the second flanges being in contact with the second rotary member.

2. The one-way clutch as claimed in claim 1, wherein the second flanges and tangs are arranged alternately around an outer peripheral edge of the sliding bearing.

3. The one-way clutch as claimed in claim 1, wherein the sliding bearing includes a portion connecting the first flange and second flanges to each other, and the connecting portion and the radially extending portions of the tangs lie in the same plane.

4. The one-way clutch as claimed in claim 1, wherein the holding portion is provided at an outer peripheral portion of each of the tangs.

5. In a one-way clutch including first and second rotary members arranged concentrically and rotatably relative to each other with an annular spacing therebetween, a torque-transmitting member provided between the first and second rotary members to transmit torques between the first and second rotary members, and a sliding bearing provided between the first and second rotary members so as to maintain the first and second rotary members in a concentric relation, the improvement wherein the sliding bearing comprises a first flange and second flanges extending along the mutually-opposing surfaces of the first and second rotary members, respectively, and tangs extending in the radial direction and secured on the second rotary member, wherein the first flange is slidable on the first rotary member and the second flanges are in contact with the second rotary member, wherein the clutch further comprises an annular outer cage and an inner cage interposed between the first and second rotary members in order to hold the torque-transmitting member at a predetermined position.

6. The one-way clutch as claimed in claim 5 wherein the outer and inner cages each have annular flanges bent substantially at right angles along one edge thereof in directions away from each other, and the thus-bent edges of the annular flanges are respectively in contact with an inner surface of the first flange and second flanges.

7. In a one-way clutch including first and second rotary members arranged concentrically and rotatably relative to each other with an annular spacing therebetween, a torque-transmitting member provided between the first and second rotary members to transmit torques between the first and second rotary members, and a sliding bearing provided between the first and second rotary members so as to maintain the first and second rotary members in a concentric relation, the improvement wherein the sliding bearing comprises a first flange and second flanges extending along the mutually-opposing surfaces of the first and second rotary members, respectively, and tangs extending in the radial direction and secured on the second rotary member, wherein the first flange is slidable on the first rotary member and the second flanges are in contact with the second rotary member, and wherein the torque transmitting member is a sprag.

* * * * *